(No Model.)
W. W. WATSON.
PLOW FENDER.
No. 431,015. Patented June 24, 1890.
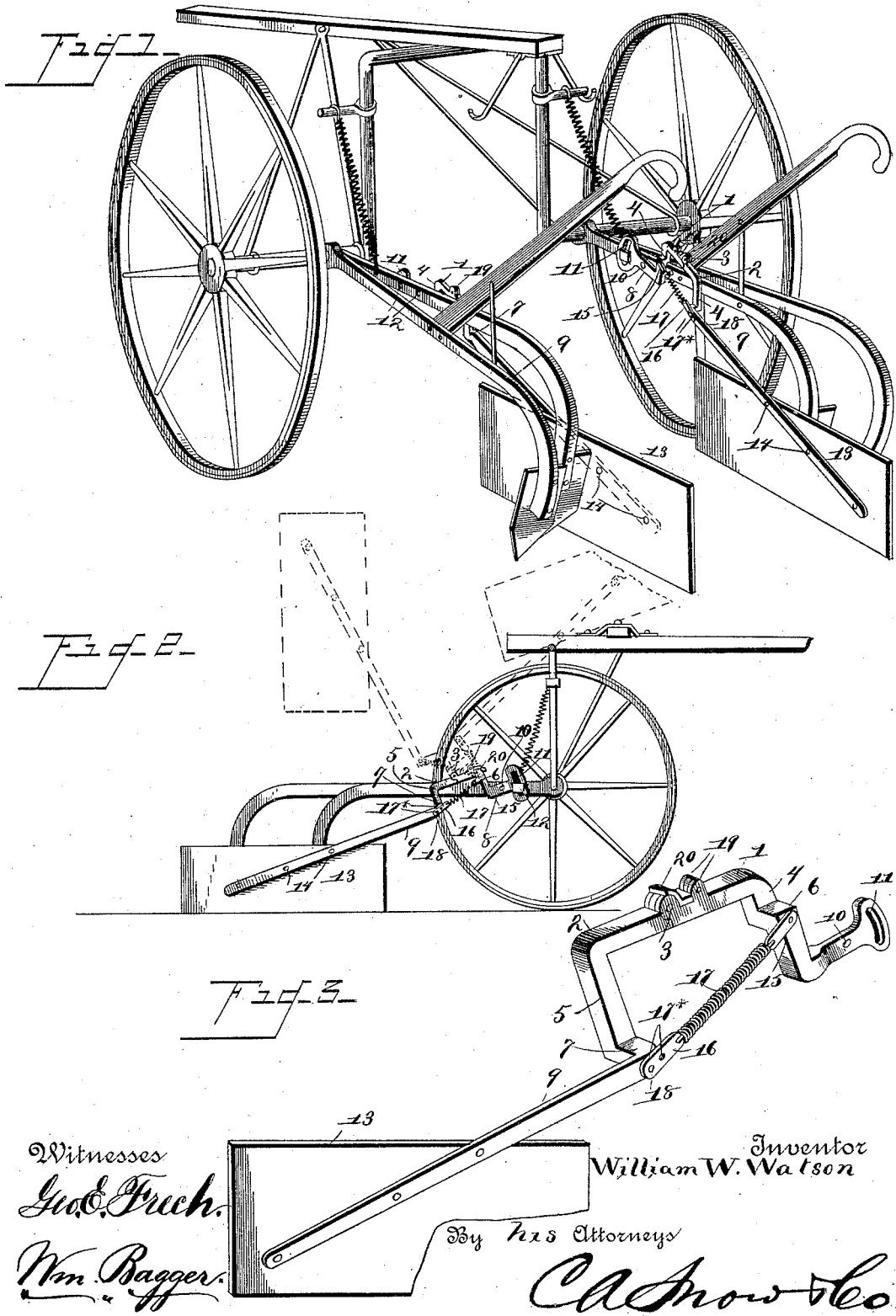
Witnesses
Geo. E. Fuch.
Wm. Bagger.
Inventor
William W. Watson
By his Attorneys
C. A. Snow & Co.

UNITED STATES PATENT OFFICE.

WILLIAM W. WATSON, OF LEWISVILLE, INDIANA, ASSIGNOR OF ONE-HALF TO GEORGE B. MORRIS, OF SAME PLACE.

PLOW-FENDER.

SPECIFICATION forming part of Letters Patent No. 431,015, dated June 24, 1890.

Application filed January 18, 1890. Serial No. 337,305. (No model.)

*To all whom it may concern:*

Be it known that I, WILLIAM W. WATSON, a citizen of the United States, residing at Lewisville, in the county of Henry and State of Indiana, have invented a new and useful Plow-Fender, of which the following is a specification.

This invention relates to plow-fenders; and it has for its object to so construct a fender as to render it capable of being attached in operative position to any cultivator-plow of ordinary construction in such a manner as to enable it to ride over rocks and other obstructions without injury to any of its parts, and, furthermore, in such a manner as to enable it to be raised and thrown out of operation when desired.

With these ends in view the invention consists in the improved construction, arrangement, and combination of parts, which will be hereinafter fully described, and particularly pointed out in the claims.

In the drawings, Figure 1 is a perspective view of a cultivator-plow equipped with my improved fender attachment. Fig. 2 is a side view of the same, with dotted lines showing the fender raised to an inoperative position. Fig. 3 is a perspective view of the fender detached.

Like numerals of reference indicate like parts in all the figures.

1 and 2 designate a pair of arms connected by a hinge-joint 3, and provided at their ends with downwardly-extending brackets 4 and 5, provided with offsets, (designated, respectively, by 6 and 7,) and terminating at their lower ends in the outwardly-extending arms 8 and 9. The arm 8 is provided at its outer or front end with a transverse perforation 10 and a slot 11 to receive the bolts 12, by means of which it is attached to a plow-beam in position for operation, the bolt working in the slot 11 permitting the rear end of said arm to be adjusted vertically for the purpose of regulating and adjusting the position of the device. The arm 9 is extended rearwardly in an oblique downward direction, and to it is attached the fender-blade 13, which may be secured to the said arm by means of bolts or rivets 14.

To the brackets 4 and 5, adjacent to the offsets in said brackets, are pivoted the arms 15 and 16, the inner ends of which are connected by a stiff coiled spring 17. One of the arms 16 may be provided with a series of perforations 17*, in any of which its pivotal bolt 18 may be adjusted for the purpose of regulating the tension of the spring. The arm 1 is provided on its upper side with lugs 19, between which is mounted a pivoted catch 20, which serves to arrest the arm 2 when the latter is raised to a vertical position. Said catch, however, may be thrown in a forward direction to rest upon the arm 1, and thus enable the arm 2 to be thrown forwardly to the position shown in dotted lines in Fig. 3 of the drawings.

The operation of this invention and its advantages will be readily understood from the foregoing description, taken in connection with the drawings hereto annexed. It will be seen that the spring 17, which connects the brackets 4 and 5 of the hinged arms 1 and 2, permits the arm carrying the fender-blade to yield in an upward direction when rocks or other obstructions are encountered, thus permitting such obstructions to be passed without breakage or danger of injury to any of the parts of the device. The offsets 6 7 in the brackets 4 and 5 form a sufficient space for the spring to play in without coming in contact with the arms or brackets. When desired, the rear arm carrying the fender may be raised to a vertical position, as shown in dotted lines in Fig. 2, thus throwing the fender-blade temporarily out of operation.

The construction of the device is simple and inexpensive, and it is capable of being conveniently attached to any plow of ordinary construction.

Having thus described my invention, what I claim, and desire to secure by Letters Patent, is—

1. In a plow-fender, the combination of a pair of arms hinged together and having downwardly-extending brackets provided with outwardly-extending arms, a fender-blade attached to one of said arms, and a spring connecting the brackets, substantially as and for the purpose set forth.

2. In a plow-fender, the combination of the hinged parts or members, each comprising a horizontal arm, the downwardly-extending bracket having an offset, and an arm extending outwardly from the lower end of said bracket, a fender-blade attached to the rearwardly-extending arm, means, substantially as described, for attaching the forwardly-extending arm to a plow-beam in position for operation, arms connected pivotally to the brackets at points adjacent to the offsets therein, and a spring connecting the said pivoted arms, substantially as and for the purpose set forth.

3. In a plow-fender, the combination of the hinged parts or members, the fender-blade attached to a rearwardly-extending arm of the rear member, a catch mounted pivotally upon the front member, and a coiled spring connecting the said members, substantially in the manner and for the purpose herein set forth.

4. In a plow-fender, the combination of the hinged parts or members, each having a vertical bracket provided with a shoulder or offset, a fender-blade attached to a rearwardly-extending arm of one of said members, a catch mounted pivotally upon the upper side of the other member, arms connected pivotally to the brackets of said members adjacent to the shoulders or offsets therein, one of said arms being provided with perforations, whereby it is adjustable upon its pivotal bolt, and a spring connecting the ends of the said pivoted arms, substantially as and for the purpose herein set forth.

In testimony that I claim the foregoing as my own I have hereto affixed my signature in presence of two witnesses.

W. W. WATSON.

Witnesses:
A. R. McILVAINE,
C. C. BROWN.